United States Patent
Palmer et al.

(10) Patent No.: US 7,356,583 B2
(45) Date of Patent: Apr. 8, 2008

(54) INDIRECT MEASUREMENT OF BUSINESS PROCESSES

(75) Inventors: John Palmer, San Gabriel, CA (US); George O. Vazquez, Sherman Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 849 days.

(21) Appl. No.: 10/269,510

(22) Filed: Oct. 11, 2002

(65) Prior Publication Data

US 2004/0073657 A1    Apr. 15, 2004

(51) Int. Cl.
G06F 15/173    (2006.01)
(52) U.S. Cl. .................. 709/224; 715/771; 715/772
(58) Field of Classification Search ............ 709/224; 715/771, 772; 700/17
See application file for complete search history.

(56) References Cited

U.S. PATENT DOCUMENTS

| | | | | |
|---|---|---|---|---|
| 5,067,977 A | * | 11/1991 | Deb ..................... | 65/29.18 |
| 5,850,548 A | * | 12/1998 | Williams ................ | 717/107 |
| 5,966,510 A | * | 10/1999 | Carbonneau et al. ...... | 714/44 |
| 6,081,207 A | * | 6/2000 | Batio ..................... | 341/20 |
| 7,000,193 B1 | * | 2/2006 | Impink et al. .......... | 715/771 |
| 2002/0111887 A1 | | 8/2002 | McFarlane et al. | |

FOREIGN PATENT DOCUMENTS

WO    WO 00 19664 A    6/2000

OTHER PUBLICATIONS

Helman, P., et al.: "Statistical Foundations of Audit Trail Analysis for the Detection of Computer Misuse", IEEE Transactions on Software Engineering, IEEE Inc. New York, US, vol. 19, No. 9, Sep. 1, 1993, pp. 886-901, XP000415033 ISSN: 0098-5589, I. Introduction, II. Detection Objectives.

Heatley, S. K., et al.: "Data Mining Computer Audit Logs to Detect Computer Misuse", International Journal of Intelligent Systems in Accounting, Finance and Management, Sep. 1998, Wiley, UK, vol. 7, No. 3, pp. 125-134, XP001156255, ISSN: 1055-615X, Introduction p. 125-27, Data Mining Process p. 127-32.

Lane, et al., "Temporal Sequence Learning and Data Reduction for Anomaly Detection" ACM Transactions on Information and System Security, ACM, New York, NY, US, vol. 2, No. 3, Aug. 1999, pp. 296-331, XP002907154, ISSN: 1094-9224, *Abstract*, 1. Introduction, 2. Building Classification Models.

Lee, et al., Data Mining Approaches for Intrusion of the Seventh Usenix Security Symposium, Proceedings of the Seventh Usenix Security Symposim, San Antonio, TX, USA, Jan. 26-29, 1998, pp. 79-93, XP002264916, 1998, Berkeley, CA, USA, Usenix Assoc, USA, ISBN: 1-880446-92-8, 1. Introduction, 2. Building Classification Models.

* cited by examiner

*Primary Examiner*—Yves Dalencourt
(74) *Attorney, Agent, or Firm*—Tarolli, Sundheim, Covell & Tummino LLP (57) ABSTRACT

Systems and methods are provided for collecting a set of values from a computing device and associating the collected set of values with a process, such as an business process or industrial process. Process activity is monitored by collecting one or more parameters associated with specific repeatable tasks or activities performed on a computing device. The one or more collected parameters are then aggregated to form a specific process pattern that can be associated with the actual throughput and efficiency of a process.

18 Claims, 7 Drawing Sheets

INDIRECT MEASUREMENT OF BUSINESS PROCESSES

TECHNICAL FIELD

The present invention relates generally to computer systems, and more particularly to a system and method for monitoring metrics of one or more computers and associating the monitored metrics to a business or industrial process.

BACKGROUND OF THE INVENTION

The emergence of the desktop computer has provided a mechanism to efficiently automate various business processes within and outside an organization. With the advent of intranet and Internet applications, computing system requirements and demands have increased dramatically. Many businesses, for example, have made important investments relating to intranet and Internet technology to support growing electronic businesses, such as E-Commerce. Since companies are relying on an ever increasing amount of network commerce to support their businesses, computing systems generally have become more complex in order to substantially ensure that servers providing network services never fail. Consequently, system reliability is an important aspect to the modern business model.

However, computer systems and communications associated with the network technology coupled to the computer systems do experience failures. Monitoring systems that monitor operational metrics (e.g., computer events) and performance metrics (e.g., resource utilization) have been provided to monitor system performance of one or more computers coupled to a network. System monitors provide a quick response view of pertinent performance information (e.g., requests/second, CPU utilization, memory utilization) and event monitors provide a list of events errors, warnings, and other system activities that occur. Additionally, status views may be provided wherein network wide status may be viewed and/or individual computer status viewed. Status may include health state, load-balancing related status, current synchronization status, entity health metrics, monitor related metrics, and/or synchronization loop state, for example.

Typically, this performance information, event information and status information can be monitored from a central network server by a system administrator. The performance information, event information and status information can be used to detect and correct faults in one or more computer systems of the monitored network. During correction of these faults, a system administrator may have to shutdown some or all of the network or specific areas of the network dedicated to certain business processes. Some of these faults can be extremely costly to a business, and the costs continue while the system is down or not executing. For example, employees can be standing around waiting for the system administrator to correct problems with the network. Additionally, tasks flowing outside the business, such as bills, products, orders and other business processes can be at a stand still.

Additional costs occur when employees are not executing tasks on a computer related to their work, such as surfing the Internet instead of typing up work documents, sending out bills, and executing business transactions. System monitors cannot determine losses and damages to the business or industrial processes or the overall business when faults occur and/or deviation from standard business or industrial processes occur.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for monitoring a process (e.g., business, industrial). One or more real-time parameters of a computer are monitored during tasks performed on the computer relating to a process. The one or more parameters are aggregated into a process pattern. The process pattern is analyzed by comparing the process pattern to a pattern database or library that contains a plurality of process pattern signatures. The process pattern signatures can correspond to specific tasks being performed in a business process. Additionally, the process pattern signatures can correspond to efficiencies of tasks and/or exceptions of tasks. The exceptions of tasks relate to undesirable activity (e.g., non-work related) being performed on the computer, and/or errors that occur in the system. The efficiency activity can relate to desirable activity being performed at undesirable levels and/or slowly occurring errors in the system. Cost can be associated with the process outputs relating to exceptions and inefficiencies of the system.

The one or more real-time parameters can include external monitored parameters of a computer, such as thermal response of drive activity, current drawn from a computer power supply, and radiation patterns from a computer monitor. In this situation, a thermal camera can be provided to monitor thermal parameters associated with execution of devices on the computing device. Additionally, sensors can be implemented into the computing device and a RF sensor monitor provided to monitor the one or more real-time parameters. The one or more real-time parameters can include internal monitored parameters of a computer, such as memory usage, CPU usage, network activity and program status. A network monitor can be provided to poll metric information (e.g., event metrics, performance metrics, status metrics) of a plurality of computing systems coupled to a network. Alternatively, individual metric monitors can implemented into each computer and a network monitor provided to poll process information from the individual monitors.

In one aspect of the invention, a library builder is provided that allows a user to build a plurality of business process signatures associated with different tasks being performed on a computer system. The library builder includes a statistic monitor that monitors real time-parameters associated with tasks being performed on a computerized system. A user interface allows a user to select a business process activity name and a time period and begin building business process pattern signatures. A statistic builder (e.g., decision network) is provided to build business process pattern signatures from the monitored real-time parameters and add the business process pattern signatures to a pattern database or library.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is

DETAILED DESCRIPTION OF INVENTION

The present invention provides for systems and methods for collecting a set of values from a computing device and associating the collected set of values with a process. Process activity is monitored by collecting one or more parameters associated with specific repeatable tasks or activities (e.g., supermarket checkout, data input, document preparation, inventory control, accounts payable, accounts receivable, shipping, assembly line production) performed on a computing device. The one or more collected parameters are then aggregated to form a specific process pattern that can be associated with the actual throughput and efficiency of a process (e.g., business, industrial, manual, automated). The one or more parameters can include external monitored parameters of a computer, such as thermal response of drive activity, current drawn from a computer power supply, and radiation patterns from a computer monitor. The one or more parameters can include internal monitored parameters of a computer, such as memory usage, CPU usage, network activity and program status.

In the following description, for purposes of explanation, numerous examples are set forth in order to provide a thorough understanding of the present invention. It may be evident, however, that the present invention may be practiced in other examples not set forth in the following description. In other instances, structures and devices are shown in block diagram form in order to facilitate describing various aspects of the present invention. Although the present examples are illustrated with respect to a business process, the present invention is also applicable to other processes, such as industrial applications or any other process related to performing specific tasks on a computing device. Additionally, the present invention has applications to monitoring of computer tasks that are performed both manually, and automatically.

Figure 1:
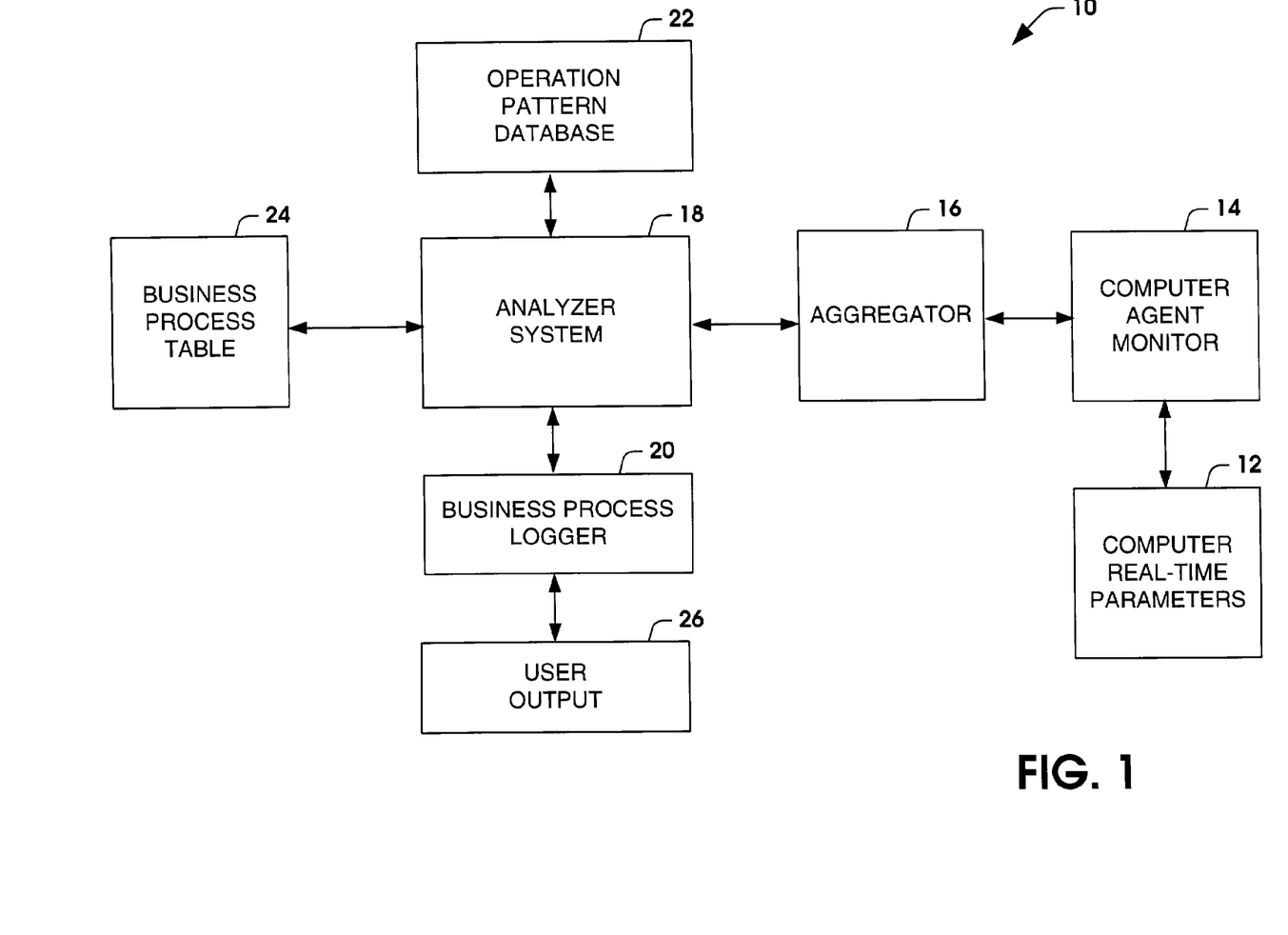
FIG. 1 illustrates a block diagram of a system for monitoring a business process in accordance with an aspect of the present invention.

FIG. 1 illustrates a system 10 for monitoring a process (e.g., business, industrial in accordance with an aspect of the present invention. The system 10 includes a computer agent monitor 14 that monitors and collects one or more computer real-time parameters 12. The computer real-time parameters 12 relate to external and/or internal parameters associated with activity on a computer or computing device. For example, a specific and repeatable task provides patterns of the external and/or internal parameters associated with computer activity. The computer activity can be monitored and sampled at specific time periods (e.g., seconds, minutes, hours, days, weeks) over specific time intervals (e.g., morning, afternoon, early evening, late night). The computer agent monitor 14 then provides the sampled parameters to an aggregator 16. The aggregator 16 combines the one or more computer real-time parameters 12 over the time periods and time intervals into a process pattern. The process pattern is then provided to an analyzer system 18.

The analyzer system 18 compares the process pattern with an operation pattern database 22. The operation pattern database 22 includes a plurality of process patterns or signatures associated with specific processes performed on a computer or computing device. The analyzer system 18 searches the operation pattern database 22 for a matching pattern. If a pattern is found, an associated pattern identification number is employed to locate the specific process being performed in a process table 24. The process table 24 can include desirable process activity in addition to undesirable activity. For example, a user can be typing using a word processor application program. Detection of this activity may be considered desirable based on the user's title or position. Alternatively, excessive Internet activity on a user's computer may be considered an undesirable activity. The matched process is then logged into a business process logger 20. The process logger 20 includes log activity over specific time periods and specific time intervals. The process log is then provided to a user output 26. The user output 26 can be an output report or file, a printer, a graphical user interface, a computer display or another computer.

The operation pattern database 22 can be trained prior to implementation into the system 10. For example, computer parameters can be monitored during specific tasks and patterns determined based on the monitored parameters. The patterns can then be stored in the operation pattern database 22 and associated with the specific task. If no match is found by the analyzer system 18, the analyzer system 18 can provide a "No Associated Process Found" entry. An administrator can then determine that a new process needs to be associated with the new task. The new task can be analyzed and a new pattern entered into the operation database 22 and a new process term entered into the process table 24. Alternatively, the analyzer system 18 can be self-learning such that an occurrence of a new process pattern results in the analyzer system 18 entering a new pattern into the operation pattern database 22 and assigning a new process term to the pattern to be entered into the process table 24.

Figure 2:
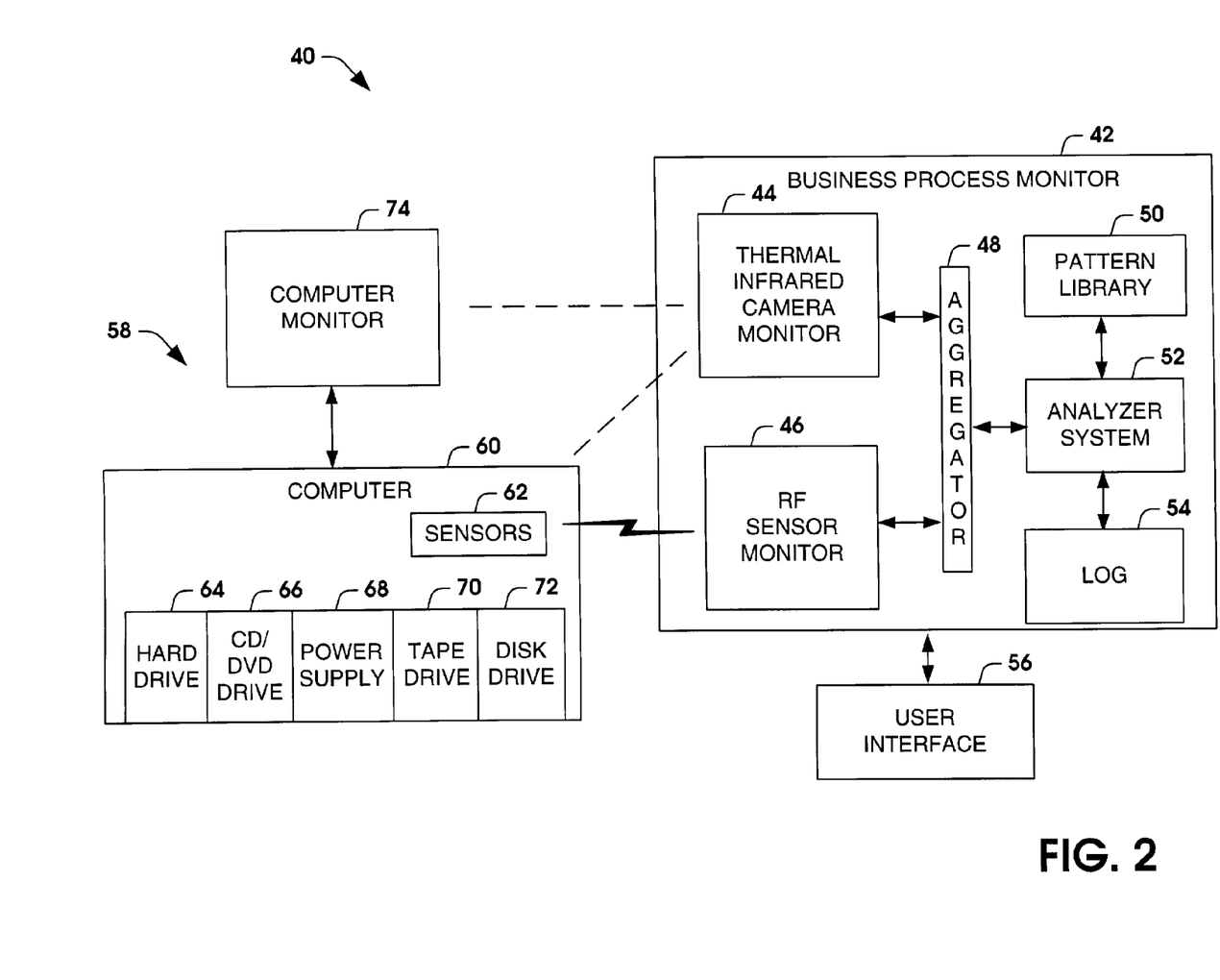
FIG. 2 illustrates a block diagram of a system for monitoring business processes using external parameters of a computer in accordance with an aspect of the present invention.

FIG. 2 illustrates a system 40 for monitoring business processes using external parameters of a computer in accordance with an aspect of the present invention. The system 40 includes a computer system 58 and a business process monitor 42. The computer system 58 includes a computer 60 having a hard drive 64, a CD/DVD drive 66, a power supply 68, a tape drive 70 and a disk drive 72. The hard drive 64, the CD/DVD drive 66, the power supply 68, the tape drive 70 and the disk drive 72 provides specific thermal parameters during execution, different stages of operation and during idleness. The specific thermal parameters can be measured and patterned to determine a pattern signature for certain business processes. One or more sensors 62 are also provided with the computer 60 to measure and transmit computer parameter information wirelessly to a RF sensor monitor 46. For example, a sensor 62 can be provided to determine the amount of current drawn from the power supply 68 during different business processes. It is to be appreciated that a variety of other computer parameters can be measured using the one or more sensors 62. The computer system 58 also includes a computer monitor 74 that emits radiation patterns during execution, different stages of operation and during idleness (e.g., screen saver).

The business process monitor 42 includes a thermal infrared camera monitor 44. The thermal infrared camera monitor 44 measures radiation patterns from the computer monitor 74. Additionally, the thermal infrared camera monitor 44 measures thermal parameters generated by the hard drive 64, the CD/DVD drive 66, the power supply 68, the tape drive 70 and the disk drive 72. The sensors 62 provide one or more computer parameters to the RF sensor monitor 46. An aggregator 48 combines measurements from the thermal infrared camera monitor 44 and the RF sensor monitor 46. The aggregator 48 provides a sampled process pattern over defined time periods and/or time intervals to an analyzer system 52. The analyzer system 52 then compares the sample process pattern to a plurality of business process patterns provided in a pattern library 50. A matched business process pattern is then stored in a log file 54.

If a match is not found and entry can be provided into the log file 54 accordingly. The analyzer system 52 can also provide new patterns and associated business processes to the pattern library 50. A user interface 56 is coupled to the business process monitor 42. The user interface 56 can provide accessibility to the log file 54. Additionally, the user interface 56 can allow an operator to program and enter new patterns into the pattern library, or access real-time parameters associated with the thermal infrared camera monitor 44, the RF sensor monitor 46 and the aggregator 48.

Figure 3:
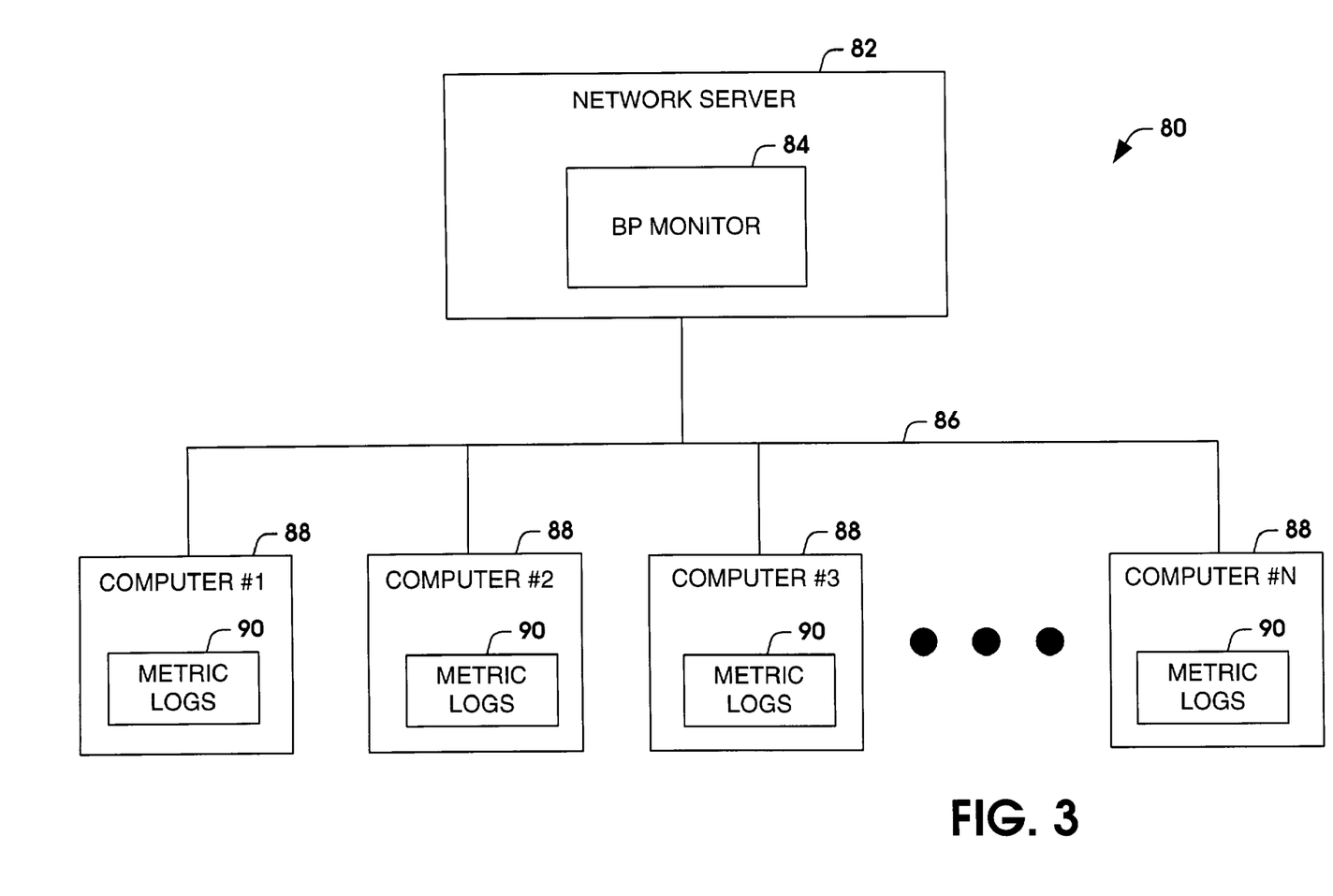
FIG. 3 illustrates a block diagram of a system network configured to monitor business processes using internal parameters of one or more computers in accordance with an aspect of the present invention.

FIG. 3 illustrates a system network 80 configured to monitor business processes using internal parameters of one or more computers in accordance with an aspect of the present invention. The system network 80 includes a network server 82 coupled to a plurality of computer systems 88 through a network backbone 86. The network server 82 and the plurality of computer systems 88 are configured as a network of computers with the server 82 providing a central control for the network. The network server 82 includes a business process monitor 84 that monitors computer parameters associated with the plurality of computers 88. The computer systems 88 include respective metric logs 90 that contain logged operation metrics (e.g., event data), performance metrics (e.g., memory usage, CPU usage, program status, network requests) and status metrics (e.g., health metrics, load-balancing related status, current synchronization status, health metrics, monitor related metrics, and/or synchronization loop state).

The business process monitor 84 periodically requests metric data from the metric logs of the plurality of computers 88. The metric log information is aggregated for the respective computers to form business process patterns. The business process patterns are then compared to a library of business process patterns. The business process monitor 84 can then determine the throughput efficiency of a given computer system 88. Additionally, the business process monitor 84 can detect exceptions that occur, for example, fault in the network, undesirable activity. The business process monitor 84 can also associate costs lost on business processes due to inefficiencies and exceptions in the network 80. The information can be provided to a system administrator through the network server 82.

Figure 4:
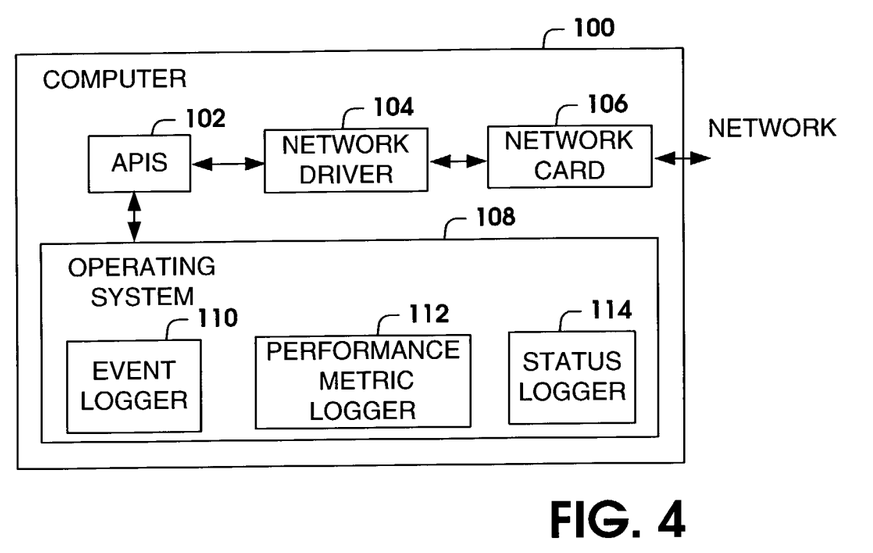
FIG. 4 illustrates a block diagram of a computer system that logs metric data associated with operation of the computer system in accordance with an aspect of the present invention.

FIG. 4 illustrates a computer system 100 that logs metric data associated with operation of the computer system 100 in accordance with an aspect of the present invention. An operation system 108 resides on the computer system 100. The operation system 108 includes an event logger 110, a performance metric logger 112 and a status logger 114. The event logger 110 logs event data associated with events that occur on the computer system during execution of one or more tasks or activities on the computer. The event logger logs errors, warnings, and other system activities that occur. The performance metric logger 112 logs performance data, for example, in performance counters. The performance data includes, for example, network requests/second, CPU utilization, memory utilization. The status logger 114 logs status data associated with status of the computer system 100 during execution of one or more tasks or activities on the computer. Status can include, for example, health state, load-balancing related status, current synchronization status, entity health metrics, monitor related metrics, and/or synchronization loop state.

The computer system 100 includes a network card 106 (e.g., LAN card) connected to a network. The network card 106 couples the computer system 100 to a network via a cable link or the like. A network driver 104 provides communications between the software of the computer system 100 and the hardware of the network card 106. One or more application program interfaces (APIs) 102 are provided to allow communications between the computer operating system 108 and requests from the business process monitor, residing locally or on a network server. The APIs 102 provide the business process monitor on the network server access to data provided by the event logger 110, the performance metric logger 112 and the status logger 114. The event data, performance metric data and the status data can be utilized to form a process pattern during an associated task to determine the efficiency and throughput of a business process.

Figure 5:
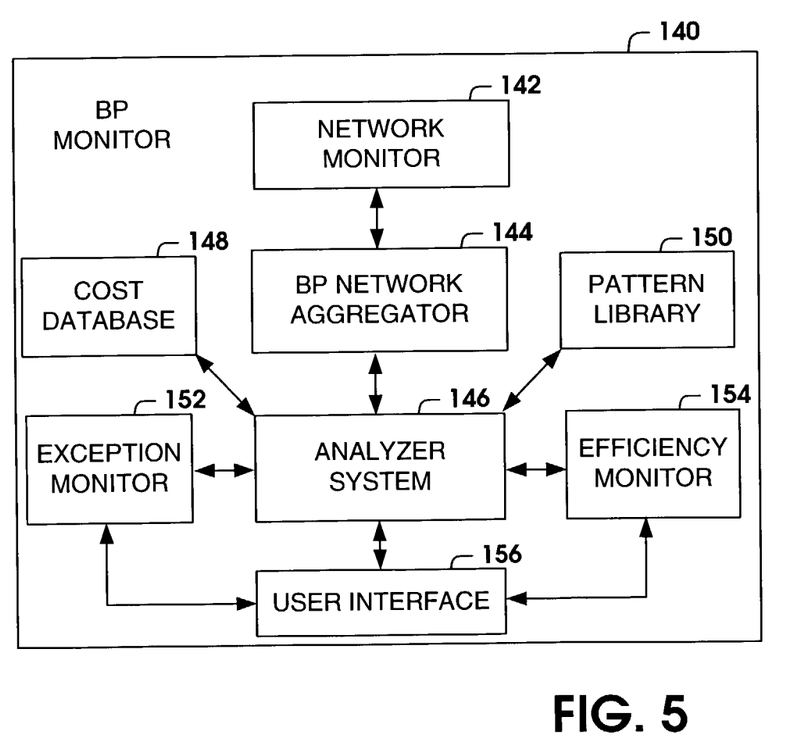
FIG. 5 illustrates a block diagram of a business process monitor in accordance with an aspect of the present invention.

FIG. 5 illustrates a business process monitor 140 in accordance with an aspect of the present invention. The business process monitor 140 retrieves metric data from one or more computers using a network monitor 142. The metric data can be retrieved periodically or specifically requested by a user. The metric data is then aggregated by a business network aggregator 144. The business network aggregator 144 combines the metrics into one or more process patterns associated with specific tasks being performed on a computer. Individual process patterns can be formed for each computer system in addition to overall process patterns associated with the network. Therefore, throughput and efficiency can be tracked for individual computer systems or the overall network. The one or more process patterns are then provided to an analyzer system 146. The analyzer system 146 compares the one or more process patterns to a pattern library 150. The pattern library 150 includes a plurality of process patterns associated with specific business processes performed on a computer. The analyzer system 146 searches the pattern library for a matching pattern.

The analyzer system 146 then determines if the match is an exception (e.g., an error in the network, undesirable task) or whether the match relates to a desirable task. The analyzer system 146 then provides the exception matches to an exception monitor 152 and the desirable tasks to an efficiency monitor 154. For example, the efficiency monitor 154 can be employed to determine when computer system operations are slowly failing, or portions of the workday that become inefficient. A cost database 148 is accessed by the analyzer system 146 to determine one or more cost losses associated with exceptions, and provide these costs to the exception monitor 152. The cost database 148 is also accessed by the analyzer system 146 to determine cost losses associated with not performing desirable activities at optimum performance. A user interface 156 is provided to allow a user to access the exception monitor 152 and the efficiency monitor 154.

Figure 6:
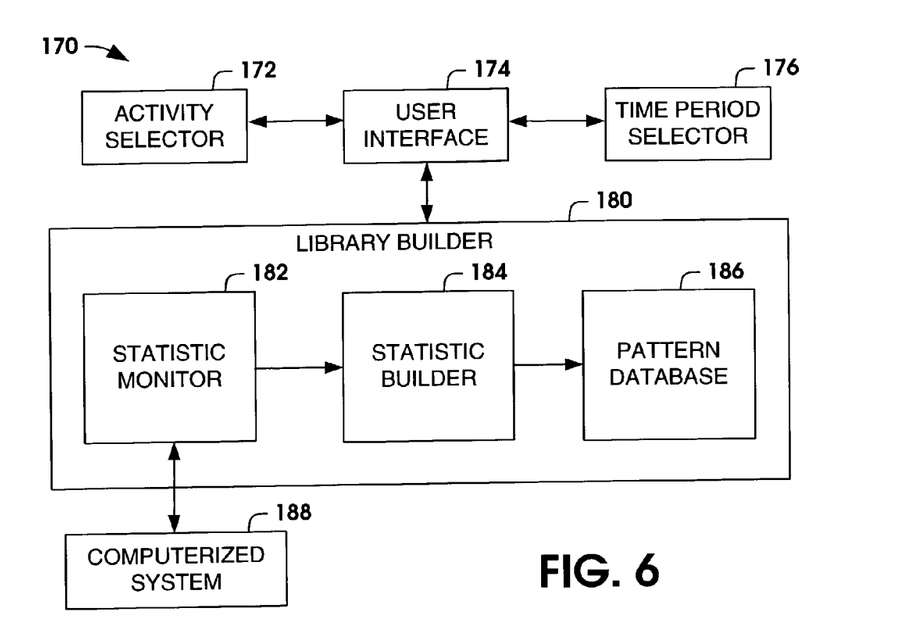
FIG. 6 illustrates a block diagram of a system for building a pattern database of one or more computer parameters associated with performing tasks on a computing device in accordance with an aspect of the present invention.

FIG. 6 illustrates a system 170 for building a pattern database of one or more computer parameters associated with performing tasks on a computing device. The system 170 includes a library builder 180 having a statistic monitor 182, a statistic builder 184 and a pattern database 186. A user interface 174 is provided that allows a user to select an activity from an activity selector 172 and select a time period for monitoring using a time period selector 176. The user can then invoke the library builder 180 utilizing the user interface 174. The statistic monitor 182 can then monitor one or more parameters associated with a computerized system during performance of specific tasks on a computer. A variety of specific tasks can be monitored by the statistics monitor 182 and patterns built by the statistic builder 184. The built patterns can be stored in the pattern database 186. Additionally, the specific tasks can be monitored at different time periods, different efficiency levels for different durations to build a variety of different patterns to be stored in the pattern database 186.

The pattern database 186 can then be provided in a system for monitoring business processes and associating efficiencies and exceptions of specific tasks performed on one or more computers. For example, the pattern database 186 can be provided on a network server and statistics polled from one or more computers on the network server. The statistics can be aggregated into a business process pattern and compared with the pattern database 186 to determine tasks being performed on the one or more computers. Alternatively, pattern databases can reside on each computer and statistics can be aggregated into a business process pattern for each computer and compared with the respective pattern database to determine tasks being performed on that respective computer. A network server can then poll the specific computers which provide the tasks, efficiency and throughput of the individual polled computers to the network server.

The statistic builder 184 can be a decision network such as a neural network. A neural network or better known as an Artificial Neural Network (ANN) are a set of algorithms or processing steps that can be used to impart the capabilities such as generalization and pattern recognition to a standard computer system. These algorithms can learn to recognize patterns or classify data sets. The neural network is provided with a set of input patterns from the one or more parameters and provides a set of output patterns to the pattern database 186. The neural network learns by changing its internal parameters in such a way that it produces the corresponding designated output pattern for a given input pattern. The output pattern is provided to the pattern database 186 which collects all of the signals from the neural network and associates parameters with the patterns. Alternatively, the statistic builder 184 can be an expert system, a Bayesian network, or a belief network. It is to be appreciated that a plurality of intelligent systems can be employed to perform the functionality of the statistic builder.

Figure 7:
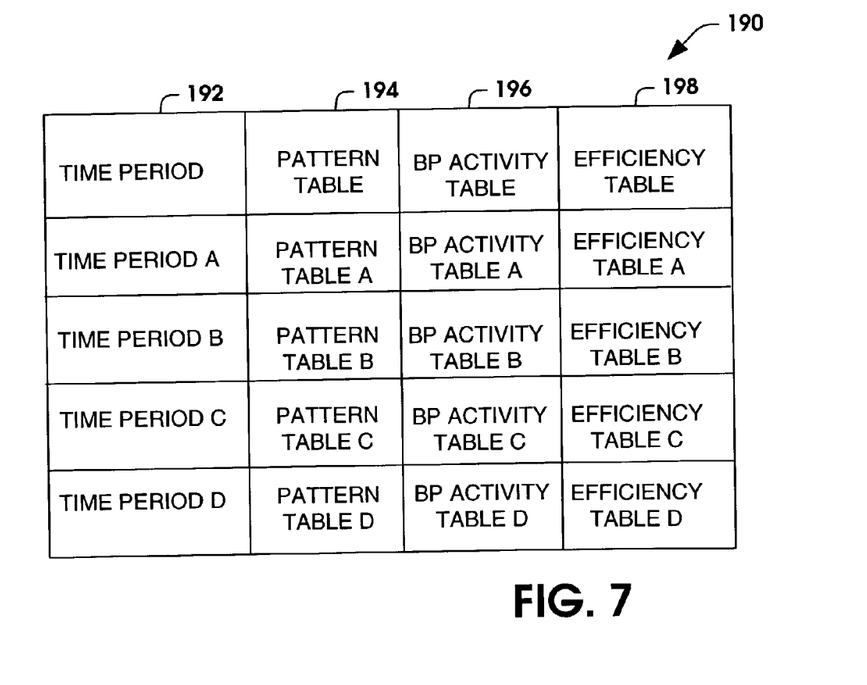
FIG. 7 illustrates an exemplary pattern database in accordance with an aspect of the present invention.

FIG. 7 illustrates one exemplary pattern database table 190 that includes a plurality of table entries 192. The table entries 192 include a time period entry including time period A, time period B, time period C and time period D. Associated with each time period entry 192 is a pattern table 194. The pattern tables 194 include a plurality of different patterns associated with values of one or more parameters during performance of different tasks on a computing device during the associated time period entry 192. The plurality of different patterns includes patterns of both desirable activities and undesirable activities being performed on a computer during a specific time period. Additionally, the pattern tables can include similar tasks being performed at different efficiency levels. A business process activity table entry 196 is provided that includes a plurality of different business process activity tables to associate the patterns with specific business activities. An efficiency table entry 198 is provided to associate the different efficiency level patterns with efficiency values. It is to be appreciated that the pattern database table 190 is one example of format for a process pattern library or database. A variety of different formats can be provided in accordance with the present invention.

Figure 8:
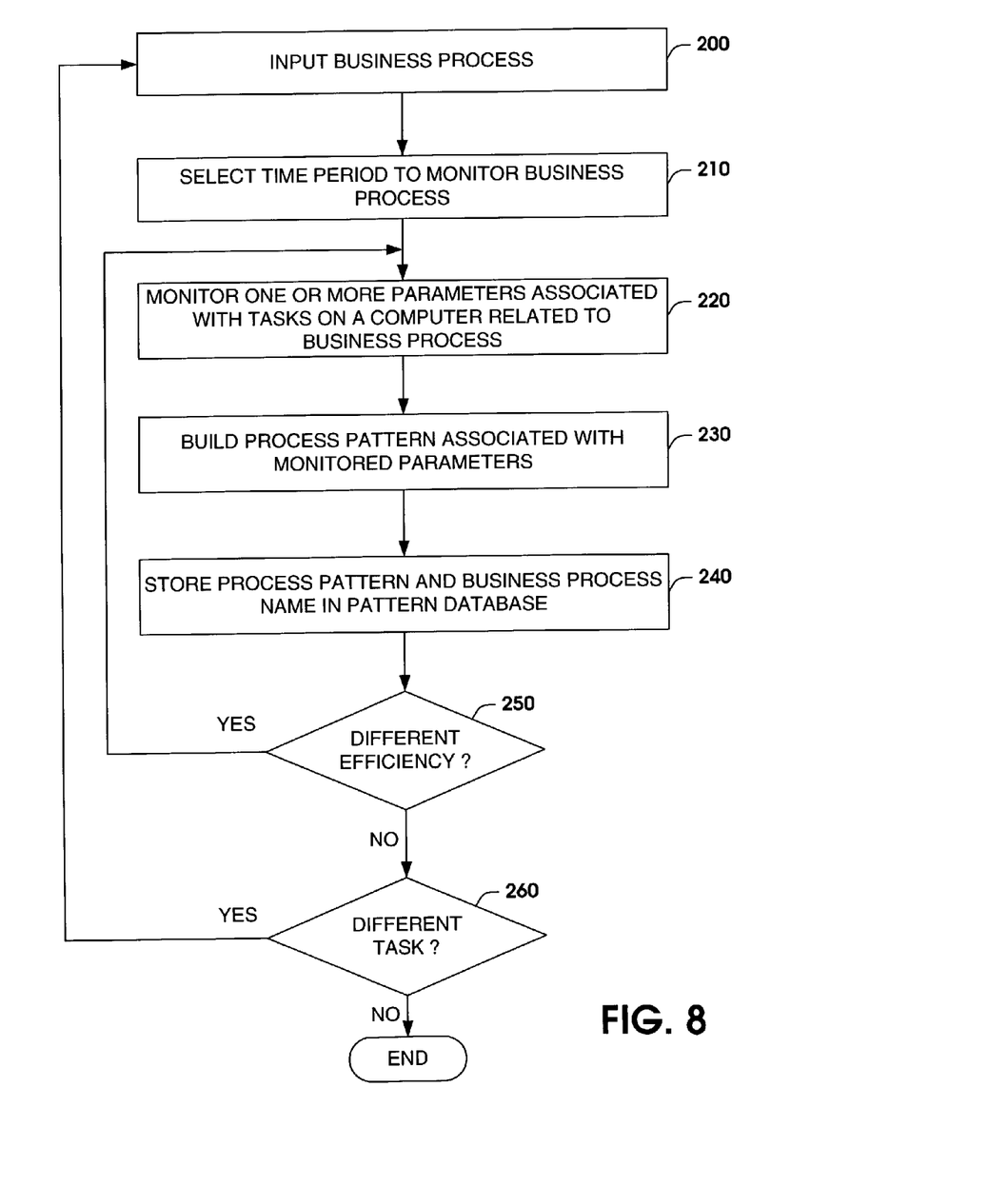
FIG. 8 illustrates a flow diagram of a methodology for building a process pattern database in accordance with an aspect of the present invention.
Figure 9:
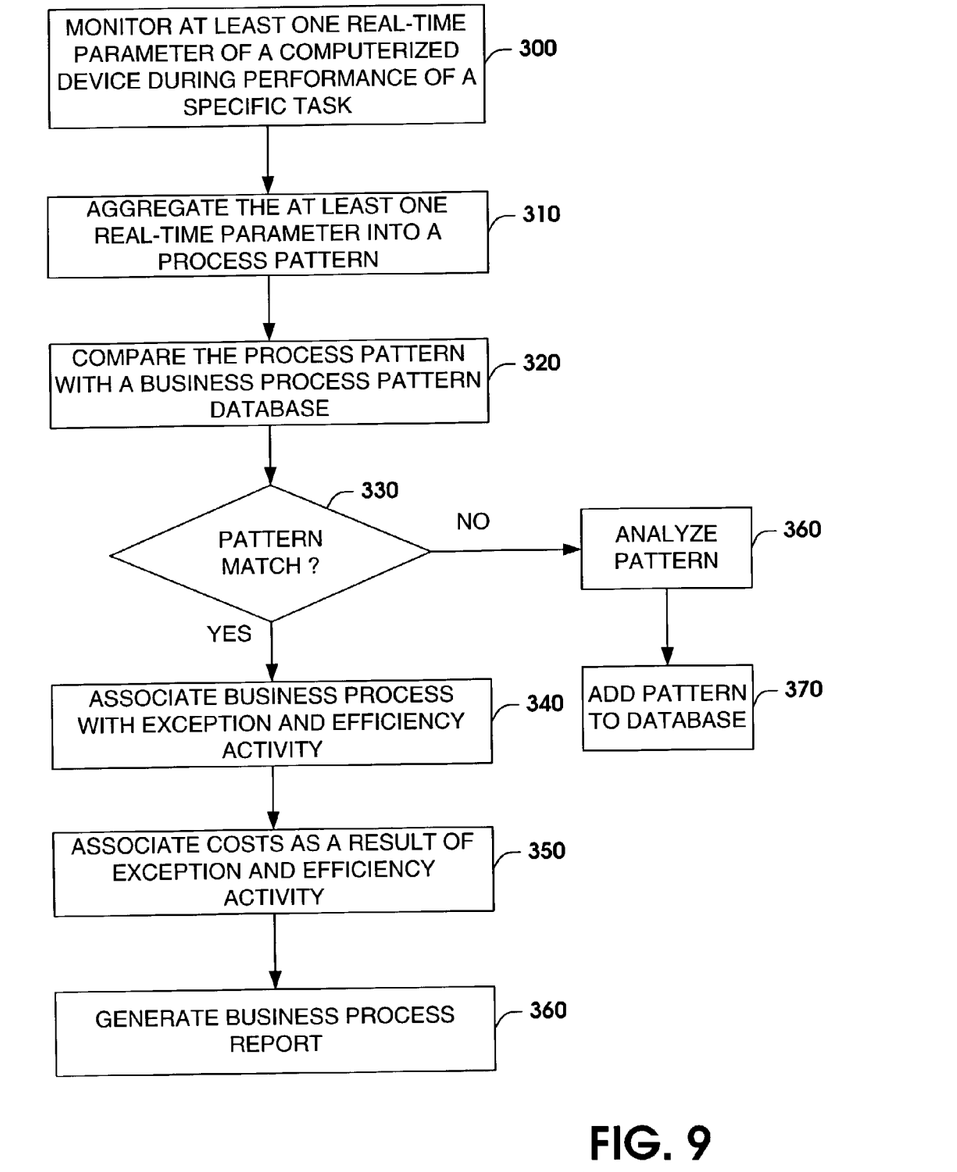
FIG. 9 illustrates a flow diagram of a methodology for monitoring a business process in accordance with an aspect of the present invention.

In view of the foregoing structural and functional features described above, methodology in accordance with various aspects of the present invention will be better appreciated with reference to FIGS. 8-9. While, for purposes of simplicity of explanation, the methodology of FIGS. 8-9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates a methodology for building a business process pattern database in accordance with an aspect of the present invention. The methodology begins at 200. At 200, an operator inputs a business process name to associate with specific tasks being executed on one or more computing devices. At 210, a time period is selected to monitor the business process. The time period can relate to a specific time period (e.g., seconds, minutes, hours, days, weeks) of a computing task and/or a specific time interval of the day (e.g., morning, afternoon, early evening, late night). The methodology then proceeds to 220. At 220, the methodology begins monitoring one or more parameters associated with task being performed on one or more computing devices related the business process. The one or more parameters can include external parameters (e.g., thermal response of drive activity, current drawn from a computer power supply, radiation patterns from a computer monitor) and/or internal parameters (e.g., memory usage, CPU usage, network activity, program status) of the computing device during execution of specific tasks related to the business process. The methodology then proceeds to 230.

At 230, the methodology builds a process pattern associated with the monitored parameters. The process pattern can be built using a statistic builder. For example, a decision network such as a neural network can be built and trained to determine a process pattern associated with tasks executed on a computing device during a business process. The methodology then advances to 240. At 240, the process pattern and the associated business process name are stored in a pattern database. The methodology then proceeds to 250. At 250, the methodology determines if a process pattern is to be built for the same business process task at a different efficiency level. If a process pattern is to be built for the same business process task at a different efficiency level (YES), the methodology returns to 220 to repeat the monitoring the one or more parameters at the different efficiency level. The actual execution of the task can be purposely performed at a lower or higher efficiency. If a process pattern is not to be built for the same business process task at a different efficiency level (NO), the methodology proceeds to 260.

At 260, the methodology determines if a process pattern is to be built for another business process and associated execution task. If a new process pattern is to be built for a new business process (YES), the methodology returns to 200 to input the new business process. If a new process pattern is not to be built for a new business process (NO), the methodology ends. The pattern database can then be implemented in a business process monitoring system.

FIG. 9 illustrates a methodology for monitoring a business process in accordance with an aspect of the present invention. The methodology begins at 300. At 300, the methodology begins monitoring at least one real-time parameter of a computerized device during performance of a specific task related to a business process. At 310, the one or more real-time parameters are aggregated into a process pattern. At 320, the process pattern is compared with a business process pattern database to determine if the database contains a process pattern related to the monitored and aggregated business process. The methodology then proceeds to 330.

At 330, the methodology determines if a process pattern match has been found in the process pattern database. If a process pattern match has not been found in the process pattern database (NO), the methodology proceeds to 360 to analyze the pattern. The pattern is then added to the process pattern database at 370. The process pattern can be added to the process pattern database by an operator, or the process pattern can be added to the process pattern database automatically and assigned a business process pattern name. If a process pattern match has been found in the process pattern database (YES), the methodology proceeds to 340 to associate the business process with exception and efficiency activity. Exception activity relates to performance of a task that is undesirable compared to a desirable task that should be performed to accomplish a business process. Efficiency activity relates to performance of a specific task and associated business process activity at less than a desirable efficiency. At 350, cost losses to the desired business process are associated with exception and efficiency activity. The methodology then proceeds to 360 to generate a business process report.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for monitoring a process associated with the execution of user tasks on a computing device, the system comprising:
   a monitor that monitors at least one real-time parameter associated with computer activity due to the execution of user tasks on a computing device;
   an aggregator that aggregates the at least one real-time parameter into a process pattern relating to the execution of user tasks on the computing device;
   a library builder that builds process pattern signatures by monitoring at least one real-time parameter during computer tasks associated with business processes and stores process pattern signatures in a pattern database, wherein each process pattern signature corresponds to at least one business process;
   a user interface that provides accessibility to the library builder to facilitate building of the process pattern signatures and allows a user to assign process names and time periods to the process pattern signatures;
   an analyzer system that compares the process pattern to the process pattern signatures in the pattern database, the analyzer system determines if a match in the pattern database corresponds to the process pattern;
   an exception monitor that identifies errors and undesirable activities performed by a user in a business process associated with the execution of the user tasks; and
   an efficiency monitor that identifies inefficiencies of business processes performed by at least one user and stores the identified inefficiencies of the business processes performed by the at least one user in a memory.

2. The system of claim 1, the at least one real-time parameter being at least one external computer parameter.

3. The system of claim 2, the external computer parameter being at least one of thermal response of drive activity, current drawn from a power supply and radiation patterns from a computer monitor.

4. The system of claim 1, the at least one real-time parameter being at least one internal computer parameter.

5. The system of claim 4, the internal computer parameter being at least one of memory usage, central processing unit usage, network activity and program status.

6. The system of claim 1, the analyzer system adds the process pattern to the pattern database if no match in the pattern database corresponds to the process pattern.

7. The system of claim 1, the analyzer system outputs a process name to a user output if a process pattern signature match occurs.

8. The system of claim 1, the monitor being a thermal infrared camera that monitors variation in thermal parameters associated with different devices on the computing device.

9. The system of claim 1, the monitor being a RF sensor monitor that receives signals from at least one sensor operative to measure parameters of the computing device during execution of user tasks, the at least one sensor transmitting parameter information to the RF sensor monitor.

10. The system of claim 1, the monitor being a network monitor that polls metric information from at least one computer connected to a network.

11. The system of claim 10, the metric information being at least one of event metrics, performance metrics and status metrics.

12. The system of claim 1, further comprising a cost database that associates cost losses due to exceptions and inefficiencies in at least one business process of the business processes.

13. A business process monitor integrated into a network server, the business process monitor comprising:
- means for monitoring at least one real-time parameter associated with computer activity due to performance of user tasks on a computer system;
- means for aggregating the at least one real-time parameter into a process pattern;
- means for building a process pattern signature library that associates, process patterns to business process tasks, and stores the association between process patterns and business process tasks as a plurality of process pattern signatures;
- means for accessing the process pattern signature library, wherein the means for accessing allows a user to assign names and time periods to the process pattern signatures; and
- means for associating the process pattern with at least one of the plurality of process pattern signatures.

14. The monitor of claim 13, further comprising means for associating at least one of exceptions, efficiencies and costs of a business process to the process pattern.

15. A method for monitoring a business process, the method comprising:
- monitoring at least one real-time parameter associated with computer activity of a computerized device during performance of a specific user task associated with a business process performed by a user;
- aggregating the at least one real-time parameter into a process pattern;
- building a business process pattern database by performing different business process tasks, monitoring user tasks and storing process patterns associated with the monitored user tasks in the business process pattern database, such that the business process pattern database contains a plurality of process pattern signatures corresponding to different computer tasks;
- accessing the business process pattern database;
- assigning at least one of a name and a time period to a least one of the process pattern signatures;
- comparing the process pattern with the plurality of process pattern signatures in the business process pattern database;
- determining if a match exists between the process pattern and the plurality of process pattern signatures in the business process pattern database;
- providing a business process output if a match exist, wherein the business process output identifies the user and the match; and
- storing the business process output in a memory.

16. The method of claim 15, further comprising adding the process pattern to the business process pattern database if a match does not exist.

17. The method of claim 15, further comprising associating the business process output with at least one of exception, efficiency and cost information relating to the business process and the performance of a specific user task.

18. The method of claim 15, the at least one real-time parameter comprising at least one of an internal computer parameter and an external computer parameter.

* * * * *